Jan. 5, 1926.
L. MELANOWSKI
POWER TRANSMITTING MECHANISM
Filed April 7, 1919
1,568,288
3 Sheets-Sheet 1
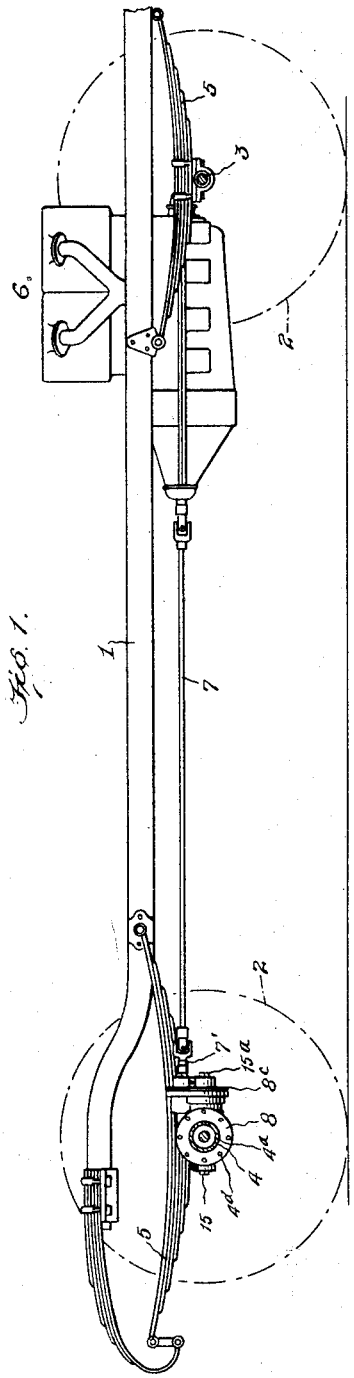
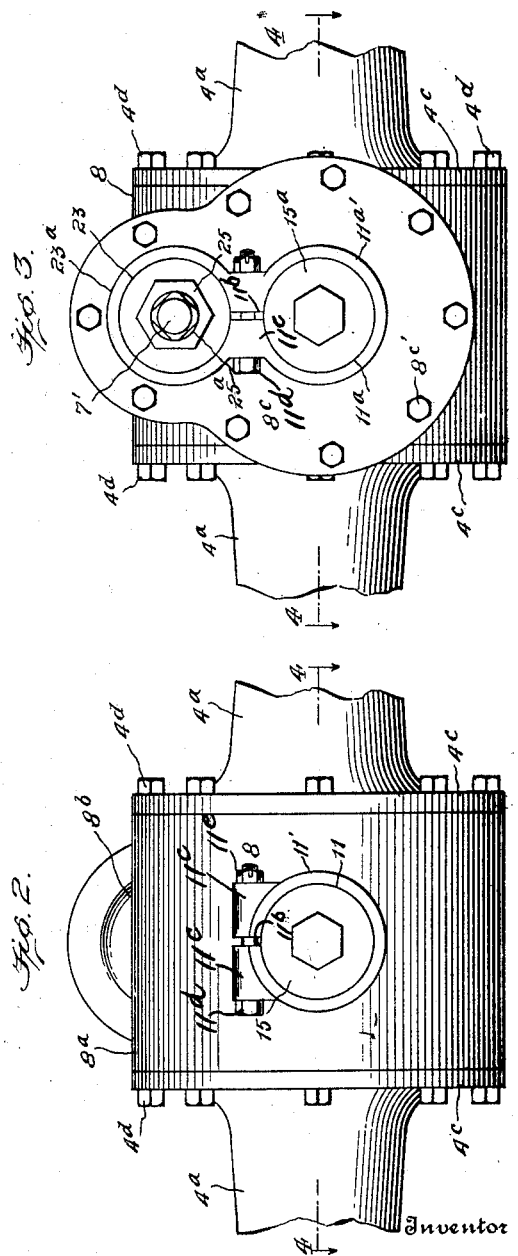
Inventor
Leo Melanowski,
By Edward R. Alexander
Attorney

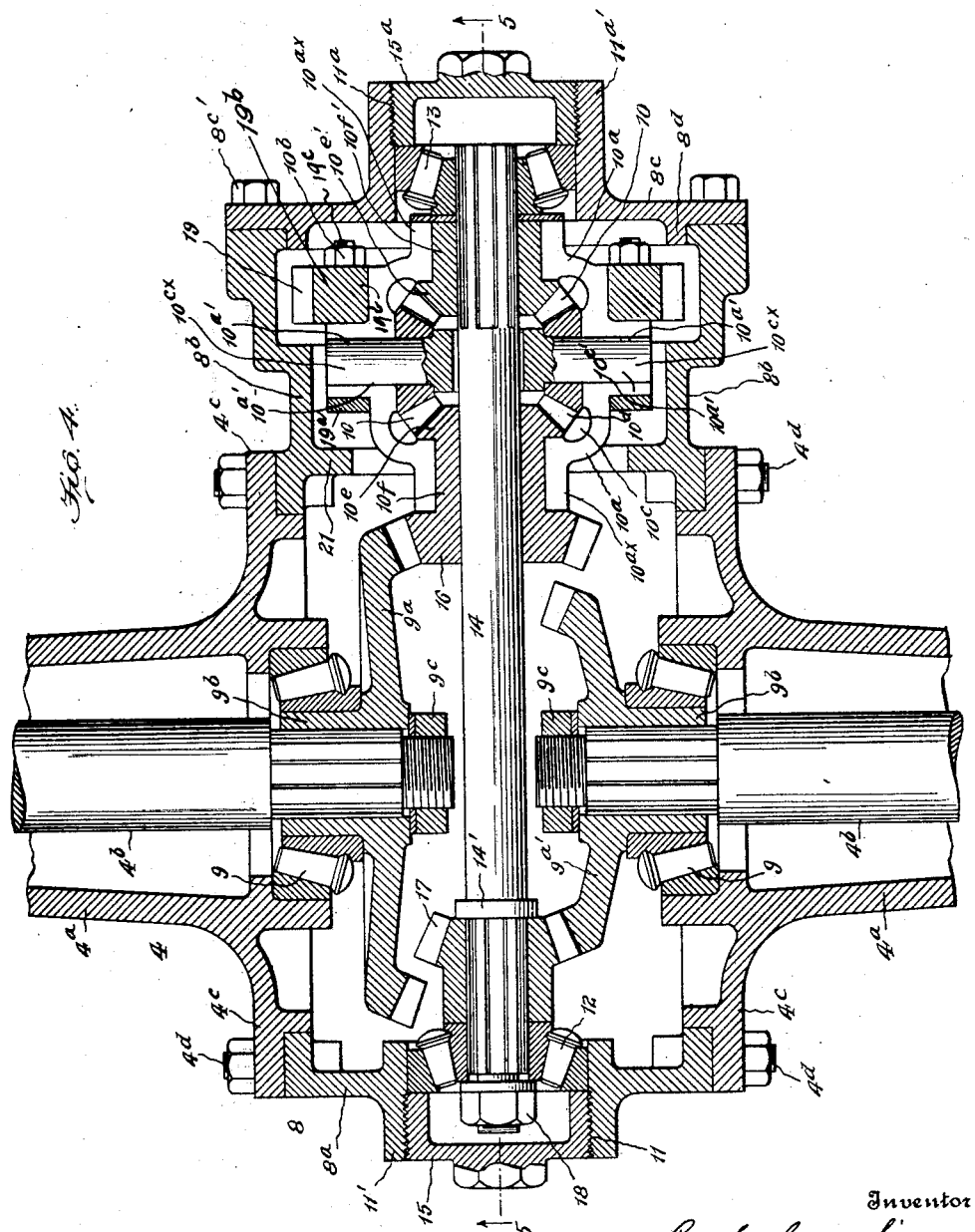

Jan. 5, 1926. 1,568,288
L. MELANOWSKI
POWER TRANSMITTING MECHANISM
Filed April 7, 1919 3 Sheets-Sheet 3

Inventor
Leo Melanowski
By Edward P. Alexander
Attorney

Patented Jan. 5, 1926.

1,568,288

UNITED STATES PATENT OFFICE.

LEO MELANOWSKI, OF CLEVELAND, OHIO, ASSIGNOR TO THE CITIZENS SAVINGS AND TRUST COMPANY, OPERATING TRUSTEE, OF CLEVELAND, OHIO, A CORPORATION OF OHIO.

POWER-TRANSMITTING MECHANISM.

Application filed April 7, 1919. Serial No. 288,012.

*To all whom it may concern:*

Be it known that I, LEO MELANOWSKI, a citizen of the Republic of France, residing at Cleveland, in the county of Cuyahoga and State of Ohio, have invented certain new and useful Improvements in and Relating to Power-Transmitting Mechanism, of which the following is a specification.

This invention relates to motor vehicles, more particularly to the power transmitting mechanism therefor.

One object of the invention is to provide an improved power transmitting mechanism capable of transmitting the power of the engine to the drive wheel or wheels of the vehicle effectively and economically.

Another object of the invention is to provide an improved power transmitting mechanism in which the proper speed reduction may be secured between the propeller shaft and the traction wheel or wheels to propel the vehicle positively and economically.

A further object of the invention is to simplify, in construction and arrangement, the elements constituting the power transmitting mechanism.

Another object of the invention is to provide mechanism of this character in which the differential elements and speed reducing elements are correlated and combined to transmit the power of the propeller shaft efficiently and with minimum friction losses.

Another object of the invention is to so construct and correlate the elements constituting differential and speed reducing elements and the housing members therefor that adjustments, assembly and disassembly of such elements and members may be readily made.

Another object of the invention is to provide between the differential mechanism and the driven axle sections speed reducing elements and to properly correlate these elements to insure maximum driving power.

Other objects of the invention will be apparent to those skilled in the art to which my invention relates from the following description, and the accompanying drawings.

For the purpose of illustration, I have, in the accompanying drawings shown and herein described one form of power transmitting mechanism embodying my invention.

In the drawings, Fig. 1 is a side elevation of a motor vehicle chassis having a power transmitting mechanism embodying my invention, the wheels on the near side of the vehicle being omitted.

Fig. 2 is a fragmentary elevational view of the rear axle and housing for the power transmitting mechanism.

Fig. 3 is a front elevational view of the parts shown in Fig. 2.

Fig. 4 is a horizontal sectional view substantially on the line 4—4 of Figs. 2 and 3.

Figure 5:
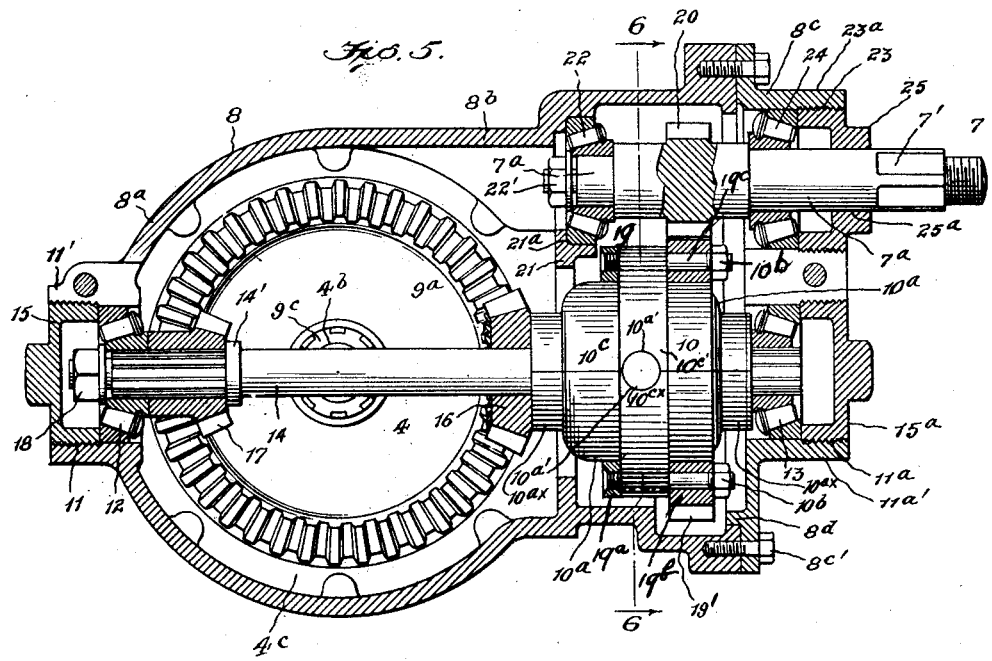
Fig. 5 is a vertical sectional view substantially on the line 5—5 of Fig. 4.
Figure 6:
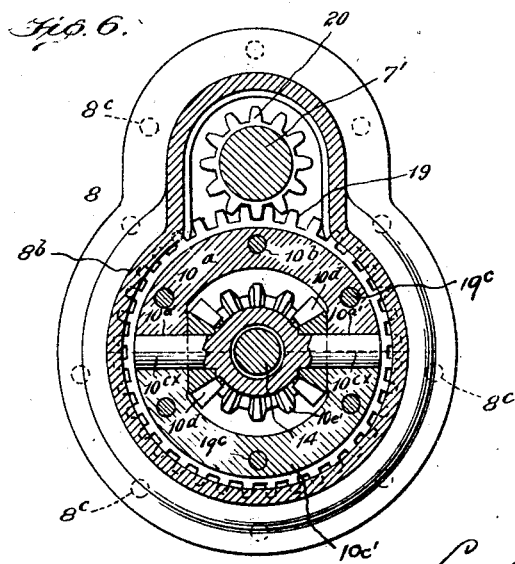
Fig. 6 is a sectional view on the line 6—6 of Fig. 5.

In the drawings, 1 indicates as an entirety a chassis mounted on front and rear wheels 2, only one of each being shown. 3 indicates the front axle and 4 indicates the rear axle. 5 indicates the springs between the chassis 1 and axles 3 and 4. 6 indicates as an entirety the power plant, preferably comprising an internal combustion motor, the shaft of which is connected in a well known way by a suitable universal joint to a propeller shaft 7. The propeller shaft 7 is, by preference, connected to the rear axle 4 and it transmits the power of the motor thereto through the transmitting elements hereinafter described. The latter are preferably constructed and correlated to permit the axis of the driving element or section 7' at the rear end of the propeller shaft to be arranged, when the chassis is disposed in normal position relative to the axes of the axles 3 and 4, in axial alignment with the axis of the motor crank shaft, whereby the latter, said element and the intermediate element or elements of the propeller shaft may be disposed end to end in axial alignment with each other and transmit the power of the motor with minimum friction losses.

The rear axle 4 preferably comprises a pair of tubular members 4$^a$. Each member 4$^a$ encloses a driven axle section 4$^b$, which is connected in any suitable manner to the adjacent rear wheel 2. At their inner ends the tubular members are flared or enlarged, as shown at 4$^c$, to form the end walls of a housing or casing 8. The flared end walls 4$^c$ are detachably secured to the casing 8 by any suitable means, such as bolts 4$^d$. Upon its inner wall and at or near its inner end, each tubular member 4ᵃ is preferably provided with an annular seat for the outer race of a thrust bearing 9.

9ᵃ, 9ᵃ′, indicate gears fixed to the inner ends of the driven axle sections 4ᵇ. Each gear may comprise a hub 9ᵇ fitting over and keyed in any suitable manner to the reduced end of the adjacent axle section and held thereon by any well known means, such as a nut 9ᶜ. The gear hub 9ᵇ is preferably adapted to receive the other race of the adjacent thrust bearing 9. The gear hub 9ᵇ is movable endwise of the shaft section to adjust the bearing 9, it being held in its adjusted position by the nut 9ᶜ. The teeth of the gear 9ᵃ are preferably of the bevel type.

The housing 8 preferably comprises a side wall 8ᵃ substantially cylindrical in cross section (see Fig. 5). On its front side, the opposite ends of the wall 8ᵃ are extended forwardly, in a substantially horizontal direction, as shown at 8ᵇ, to enclose the differential mechanism, indicated as an entirety at 10. 8ᶜ indicates a plate or cover for closing the open end of the casing 8. The plate 8ᶜ may be provided with a rib 8ᵈ, which fits the inner surface of the extended walls 8ᵇ, to form a liquid tight joint. The plate 8ᶜ is preferably removably secured to the walls of the housing by cap screws 8ᶜ′.

11 indicates an opening formed in the rear portion of the wall 8ᵃ and 11ᵃ indicates an opening formed in the plate 8ᶜ. These openings preferably are so aligned relative to each other that a straight line passing through their centers is disposed parallel to and in the vertical plane of the propeller shaft 7 or section 7′ (see Figs. 3, 4 and 5). The walls of these openings 11, 11ᵃ, preferably serve as supports or mountings for bearings 12 and 13, while the openings permit ready access to and removal of the bearings 12 and 13, and a driven shaft 14. The bearings 12 and 13 preferably comprise antifriction elements of the tapered roller type, adapted and arranged to take thrusts endwise of the shaft 14 in either direction. 15, 15ᵃ, indicate devices for closing the openings 11, 11ᵃ, respectively. The devices 15, 15ᵃ, may be provided with screw threads and have screw-threaded connection with the inner walls of the openings 11, 11ᵃ, to (1) form liquid tight joints therewith, (2) provide for or permit of the adjustment of the bearings 12 and 13, and (3) permit their easy removal and also the removal of the shaft 14. At 11′, 11ᵃ′, the housing wall 8ᵃ and plate 8ᶜ may be provided with collars to form relatively wide supporting walls for the bearings 12, 13, and closing devices 15, 15ᵃ. The outer walls of the devices 15, 15ᵃ, may be provided with polygonal members to take a spanner or wrench.

To provide for locking the adjusting devices 15, 15ᵃ, in position, the collars 11′, 11ᵃ′, are split, as shown at 11ᵇ, and provided with lugs 11ᶜ. The lugs 11ᶜ on each collar are provided with aligned openings through which extends a bolt 11ᵈ having a nut 11ᵉ, whereby the collar may be clamped against the adjacent adjusting device 15 or 15ᵃ.

Of the differential mechanism, 10ᵃ, 10ᵃ, indicate a pair of semi-circular casing members adapted to be clamped together to form a hollow casing 10ᶜ. The casing members 10ᵃ, 10ᵃ, may be secured together in any desired manner, but preferably by means indicated as an entirety at 19. Of these means, 19ᵃ indicates a ring surrounding the casing 10ᶜ and engaging the inner wall of an annular rib 10ᶜ′ provided thereon. 19ᵇ indicates a ring surrounding the casing 10ᶜ and engaging the outer wall of the rib 10ᶜ′. 19ᶜ indicates studs preferably screw-threaded in openings formed in the ring 19ᵃ and also riveted thereto. The studs 19ᶜ extend through openings formed in the rib 10ᶜ′ and ring 19ᵇ. 10ᵇ indicates nuts which are mounted on the free ends of the studs 19ᶜ and when tightened serve to clamp and secure the rings 19ᵃ and 19ᵇ against the rib 10ᶜ′ and thus maintain the semi-annular casing members 10ᵃ, 10ᵃ, rigidly together. The opposing walls of the casing members 10ᵃ and ribs 10ᶜ′ are formed with recesses 10ᵃ′ to receive and support studs 10ᶜˣ carrying bevel pinions 10ᵈ. At their inner ends the studs 10ᶜˣ may be formed integrally with a collar surrounding the shaft 14. 10ᵉ, 10ᵉ′, indicate differential gears having hubs 10ᶠ, 10ᶠ′, respectively. The gears 10ᵉ, 10ᵉ′, mesh with the pinions 10ᵈ and are rotated thereby in the usual manner. As shown in Fig. 4, the shaft 14 extends through the differential gears 10ᵉ, 10ᵉ′, it thereby serving as an axle upon which the hub 10ᶠ of the gear 10ᵉ may rotate when differential movement of the gears 10ᵉ, 10ᵉ′, takes place. The shaft 14 is connected in any well known manner at its inner end to the hub 10ᶠ′ of the gear 10ᵉ′ to transmit the power therefrom to one of the driven axle sections 4ᵇ. The differential casing members 10ᵃ, 10ᵃ, are preferably provided with tubular extensions 10ᵃˣ which may rotate upon the hubs 10ᶠ, 10ᶠ′.

16 indicates a pinion preferably connected to the hub 10ᶠ for the pinion 10ᵉ and meshing with the gear 9ᵃ. The pinion 10ᵉ, hub 10ᶠ and pinion 16 may be formed integrally to facilitate manufacture, and to insure simplicity, strength, durability and efficient operation. The adjacent extensions 10ᵃˣ of the casing members 10ᵃ are preferably of a length to occupy all the space between opposing walls of the pinions 10ᵉ and 16, thus overcoming friction losses by preventing endwise movement of these pinions and hub 10ᶠ relative to the casing members 10ᵃ and shaft 14.

17 indicates a pinion fixed in any well known manner to the outer end of the shaft 14. It is held in abutting engagement with a collar 14′ on the shaft 14 by a nut 18, acting through the inner race of the bearing 12. The pinion 17 meshes with and drives the gear 9ᵃ′.

19′ indicates a gear fixed to and surrounding the differential casing 10ᶜ. The gear 19′ is preferably formed integrally with the ring 19ᵇ; in fact, the ring 19ᵇ and gear 19′ may be formed as a single element, as shown. The ring gear 19′ is preferably provided with spur teeth and is driven by a spur pinion 20. The pinion 20 may be formed integrally with the shaft 7′ which constitutes the rearmost driving element or section of the propeller shaft 7. At 21, the housing 8 is provided with a transverse wall and at 21ᵃ this wall is formed with an annular seat to receive and support an anti-friction bearing 22 for the rear end of the shaft section 7′.

At 23, the plate 8ᶜ is formed with an opening and a collar 23ᵃ surrounding it. The inner walls of the opening and collar form a support for an anti-friction bearing 24, which in turn supports the front or opposite end of the shaft section 7′. The bearings 22 and 24 are preferably of the tapered roller type to permit their ready adjustment. The bearings may be disposed so as to take end thrusts in either direction. The shaft section 7′ is reduced, at its opposite ends, as shown at 7ᵃ, to form shoulders against which the inner races of the bearings 22 and 24 abut. The inner race for the bearing 22 may be rigidly fixed in engagement with the adjacent shoulder by a washer and a nut 22′. The opening 23 is closed by a closing device 25 which has screw threaded connection with the inner walls of the opening 23 and collar 23ᵃ, whereby the bearings 22 and 24 may be adjusted and the removal thereof and of the shaft 7′ readily made. The closing device 25 is like the closing devices 15, 15ᵃ, except that it is formed with an opening 25ᵃ for the shaft section 7′ to extend through.

While the pinion 16 and gear 9ᵃ are larger than the pinion 17 and gear 9ᵃ′, respectively, it will be noted that each pinion and adjacent gear have the same ratio as the other pinion and gear. Accordingly, the differential mechanism, acting through the gears 10ᵉ, 10ᵉ′ and shaft 14, normally will drive both axle sections at the same speed, except as differential movement may take place incident to the running of the vehicle.

It will be noted that the pinion 20 is arranged substantially midway between the bearings 22, 23, so that all strains upon the shaft sections 7′ may be divided between and withstood by both of them. Again, I have provided a spur gear and spur pinion between the propeller shaft and differential casing which operate in an advantageous manner without undue strains upon these parts. It will also be noted that I have provided a double speed reduction between the propeller shaft and the rear axle, one between the propeller shaft and the differential casing and the other between the differential gears and the inner ends of the rear axle drive sections. Furthermore, it will be noted that I have so combined and correlated the differential power transmitting and speed reducing elements that they may be made relatively small, thus insuring durability, strength, and the transmission of maximum power, at the same time permitting these elements to be enclosed in a single, relatively small housing.

To those skilled in the art, many alterations in construction and widely differing embodiments and applications of my invention will suggest themselves, without departing from the spirit and scope thereof. My disclosures and the description herein are purely illustrative and are not intended to be in any sense limiting.

What I claim is:

1. The combination with a housing formed with openings in its front and rear walls, and a pair of axle sections, of bearings mounted in said openings, a shaft mounted in said bearings, devices mounted in said openings for positioning the said bearings therein, a differential having a casing mounted on said shaft, and differential gears one of which is connected to said shaft, pinions respectively connected to said shaft and the other differential gear for driving said axle sections, a separate shaft mounted in said housing and gear connections between said shaft and said differential casing.

2. The combination with a housing formed with openings in its front and rear walls, and a pair of axle sections, of bearings mounted in said openings, a shaft mounted in said bearings, devices adjustably mounted in said openings for positioning the said bearings therein, a differential having a casing mounted on said shaft, and differential gears one of which is connected to said shaft, pinions respectively connected to said shaft and the other differential gear for driving said axle sections, a separate shaft mounted in said housing and gear connections between said shaft and said differential casing.

3. The combination with a housing formed with openings in its front and rear walls and laterally extending tubes for receiving a pair of axle sections, a pair of axle sections, of thrust bearings mounted in said openings, a differential mechanism, means for transmitting power from the gears of said differential mechanism to said axle sections, said mechanism including a shaft disposed at right angles to said axle sections and mounted in said bearings, devices in said openings for adjusting said bearings, a separate shaft mounted in said housing, and driving connections between said separate shaft and the casing of said differential mechanism.

4. The combination with a housing and a pair of axle sections, of a gear carried by each of said sections, a differential comprising a casing and a pair of differential gears having hubs on which the differential casing is rotatably supported, a shaft extending through said gears and supported at its opposite ends by said housing, said shaft being connected to one of said differential gears, and pinions connected to the other differential gear and said shaft and meshing respectively with the gears carried by said axle sections.

5. The combination with a pair of axle sections, of a housing formed with an opening in its rear wall, the front end of said housing being open, a cover for the open end of said housing formed with an opening, the centers of said openings being disposed in a horizontal plane including the axes of said axle sections, a differential having a casing, means for transmitting power from said differential to said axle sections, said differential including a driven shaft mounted in said openings, a separate shaft arranged above and in the vertical plane of said driven shaft, means for supporting said separate shaft in said housing, and driving connections between said separate shaft and the casing of said differential.

6. In apparatus of the character described, the combination with a housing having an enlarged central gear and shaft receiving section and laterally extending reduced tubular axle receiving sections, of driven axles in said tubular extensions, driven gears each disposed in said enlarged section and secured to the inner end of one of said driven axles, a shaft disposed at right angles to the axis of said gears arranged therebetween and mounted at its front and rear ends in said enlarged section, a differential mechanism mounted on said shaft and including a housing, gears mounted on said shaft and in mesh with said driven gears and operated by said differential mechanism, a spur ring gear secured to said differential housing, a countershaft, bearings for said countershaft disposed in said enlarged section at either side of said ring gear, and a pinion on said countershaft meshing with said ring gear.

In testimony whereof I affix my signature.

LEO MELANOWSKI.